United States Patent [19]
Park et al.

[11] Patent Number: 6,139,743
[45] Date of Patent: Oct. 31, 2000

[54] WASTEWATER TREATMENT APPARATUS FOR REMOVING NITROGEN AND PHOSPHORUS AND METHOD THEREFOR

[75] Inventors: Jong-bok Park, Sungnam; Keum-hee Jung; Jeong-hee Sohn, both of Seoul, all of Rep. of Korea

[73] Assignee: Samsung Engineering Co., Ltd., Seoul, Rep. of Korea

[21] Appl. No.: 09/095,717

[22] Filed: Jun. 11, 1998

[30] Foreign Application Priority Data

Jun. 12, 1997 [KR] Rep. of Korea ............ 97-24340

[51] Int. Cl.⁷ .................................... C02F 3/30
[52] U.S. Cl. ................. 210/605; 614/903; 614/906
[58] Field of Search ........................ 210/605, 610, 210/614, 621–626, 631, 903, 906

[56] References Cited

U.S. PATENT DOCUMENTS

| | | | |
|---|---|---|---|
| 5,380,438 | 1/1995 | Nungesser | 210/605 |
| 5,601,719 | 2/1997 | Hawkins et al. | 210/605 |
| 5,603,833 | 2/1997 | Miller | 210/624 |
| 5,611,927 | 3/1997 | Schmid | 210/605 |
| 5,733,456 | 3/1998 | Okey et al. | 210/605 |
| 5,853,588 | 12/1998 | Molof et al. | 210/605 |

*Primary Examiner*—Thomas G. Wyse
*Attorney, Agent, or Firm*—Burns, Doane, Swecker & Mathis, L.L.P.

[57] ABSTRACT

A wastewater treatment apparatus for removing nitrogen and phosphorus contained in wastewater, and a method therefor. The wastewater treatment apparatus includes an anaerobic/anoxic reaction tank having multiple compartments partitioned by a plurality of partitions, each compartment receiving wastewater and a carbon source; an aeration tank for removing phosphorus by luxury uptake of phosphorus from the treated wastewater flowed from the last compartment of the anaerobic/anoxic reaction tank, using oxygen as an electron acceptor; and a settling tank for settling a sludge from the treated wastewater passed from the aeration tank, and returning the settled sludge into the anaerobic/anoxic reaction tank. The wastewater treatment apparatus can increase removal efficiencies of nitrogen and phosphorus contained in the wastewater, even at a low temperature. Also, the retention time in the reaction tank is reduced, so the size of the reaction tank is reduced, thereby lowering construction costs. Also, the wastewater treatment apparatus can be added to a general wastewater treatment apparatus, thereby nitrogen and phosphorus of wastewater can be completely removed or processed to have the desired water quality level.

19 Claims, 2 Drawing Sheets

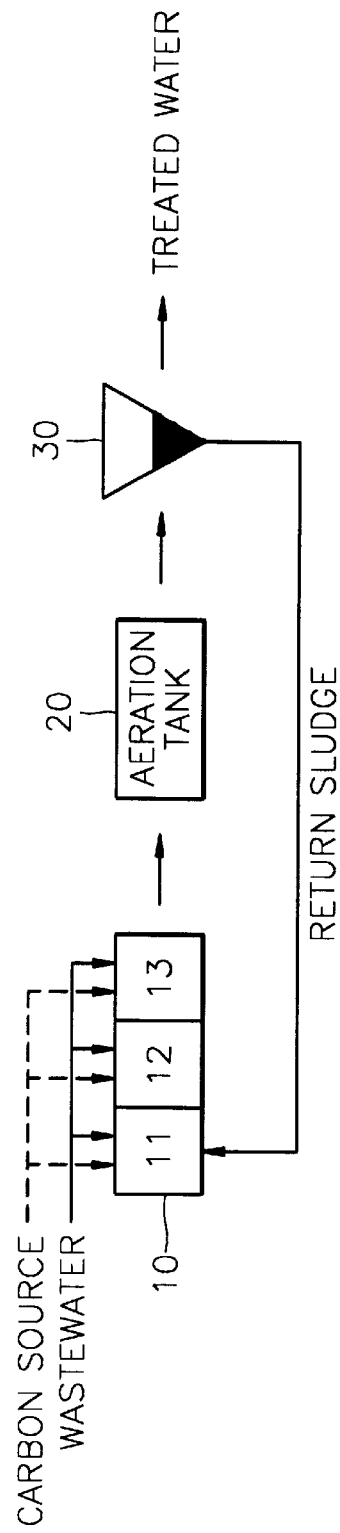
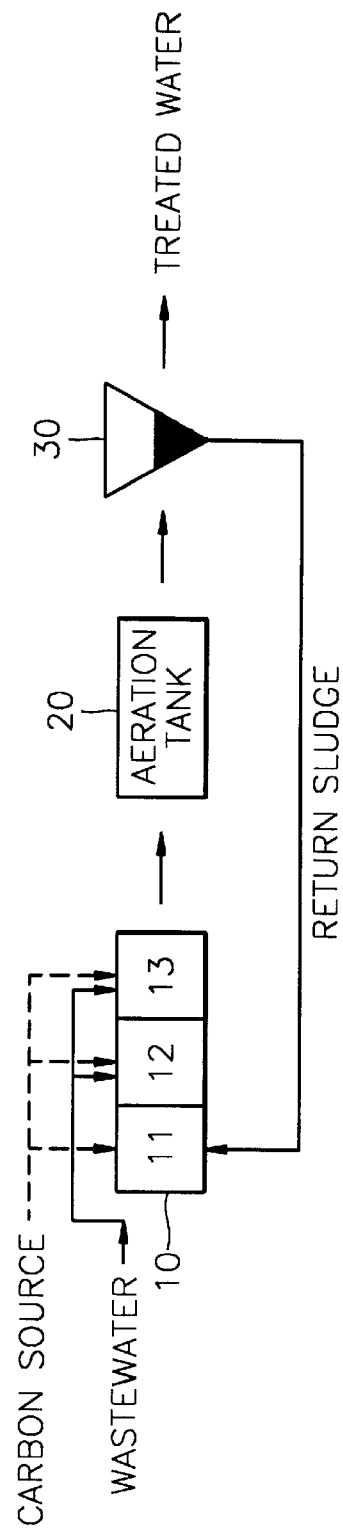

WASTEWATER TREATMENT APPARATUS FOR REMOVING NITROGEN AND PHOSPHORUS AND METHOD THEREFOR

This application claims priority under 35 U.S.C. §§119 and/or 365 to 97-24340 filed in REPUBLIC OF KOREA on Jun. 12, 1997; the entire content of which is hereby incorporated by reference.

BACKGROUND OF THE INVENTION

1. Field of the Invention

The present invention relates to a wastewater treatment apparatus for removing nitrogen and phosphorus contained in wastewater, and a method therefor.

2. Description of the Related Art

Nitrogen exists as total Kjeldahl nitrogen (TKN) containing ammonia ($NH_3$) and organic nitrogen, and nitrate nitrogen ($NO_x$) in wastewater. In order to biologically remove nitrogen components contained in wastewater, conversion into nitrate nitrogen must be preceded. The nitrate nitrogen is emitted into air after being converted into gaseous $N_2$ through denitrification by microorganisms. The denitrification by microorganisms requires presence of organic matter and inhibited by dissolved oxygen (DO) in the wastewater.

Meanwhile, in order to remove phosphorus from wastewater, after releasing phosphorus by microorganisms in anaerobic conditions, the released phosphorus must be taken up by microorganisms in aerobic conditions. Particularly, conditions for releasing phosphorus by microorganisms in anaerobic conditions require no nitrate nitrogen present. This is because the release of phosphorus is inhibited with the presence of nitrate nitrogen. That is, a reaction tank must be maintained in anaerobic conditions for the release of phosphorus, and in anoxic conditions for denitrification of the nitrate nitrogen.

In a conventional biological treatment for removing nitrogen and phosphorus from wastewater, wastewater to be treated is usually provided into a reaction tank, and then release of phosphorus and denitrification of nitrate nitrogen by microorganism are performed in anoxic conditions. Then, nitrification and "luxury uptake" of phosphorus are performed in an aeration tank. Here, a return sludge was provided to the reaction tank from the end of the aeration tank or a settling tank. Here, denitrification efficiency in the reaction tank is dependent on the content of nitrate nitrogen contained in the return sludge. Also, the removal efficiencies of nitrogen and phosphorus change according to the content of the organic matter required for the denitrification and phosphorus release reaction. Thus, when intending to remove nitrogen and phosphorus contained in the wastewater using a reaction tank instead of a multi-compartment reaction tank, removal efficiencies of nitrogen and phosphorus are different, thus extending retention time in the reaction tank and there is a limitation in removing high concentration of nitrogen and phosphorus.

Also, when wastewater temperature is low as in winter, nitrification reaction is inhibited, so nitrate nitrogen required for denitrification is not produced. In this case, the oxygen content must be supplemented to generate nitrate nitrogen. If the concentration of dissolved oxygen in the reaction tank is increased, an aerobic/anoxic condition cannot be maintained and nitrogen and phosphorus removal efficiencies are lowered.

SUMMARY OF THE INVENTION

To solve the above problems, it is an objective of the present invention to provide a wastewater treatment apparatus capable of efficiently removing nitrogen and phosphorus contained in wastewater.

It is another objective of the present invention to provide a wastewater treatment method for effectively removing nitrogen and phosphorus contained in wastewater by using the wastewater treatment apparatus according to the present invention To achieve the first objective, there is provided a wastewater treatment apparatus for removing nitrogen and phosphorus, comprising

- an anaerobic/anoxic reaction tank having multiple compartments partitioned by a plurality of partitions, each compartment receiving wastewater and a carbon source;
- an aeration tank for removing phosphorus by luxury uptake of phosphorus from the treated wastewater which has flowed from the last compartment of the anaerobic/anoxic reaction tank, using oxygen as an electron acceptor; and
- a settling tank for settling a sludge from the treated wastewater which has flowed from the aeration tank, and returning the settled sludge into the anaerobic/anoxic reaction tank.

To achieve the second objective, there is provided a method of wastewater treatment for removing nitrogen and phosphorus comprising:

- providing wastewater and a carbon source to an anaerobic/anoxic reaction tank having multiple compartments partitioned by a plurality of partitions;
- flowing the treated wastewater from the last compartment of the anaerobic/anoxic reaction tank to an aeration tank and removing phosphorus by luxury uptake of phosphorus;
- flowing the treated wastewater from the aeration tank to a settling tank and settling a sludge from the wastewater; and
- returning the settled sludge into the anaerobic/anoxic reaction tank and discharging the treated wastewater from the settling tank.

BRIEF DESCRIPTION OF THE DRAWINGS

The above objective and advantages of the present invention will become more apparent by describing in detail preferred embodiments thereof with reference to the attached drawings in which:

FIG. 1 is a schematic diagram showing a preferred embodiment of wastewater treatment process using a wastewater treatment apparatus according to the present invention.

FIG. 2 is a schematic diagram showing another embodiment of wastewater treatment process using a wastewater treatment apparatus according to the present invention.

DESCRIPTION OF THE PREFERRED EMBODIMENT

Figure 3:
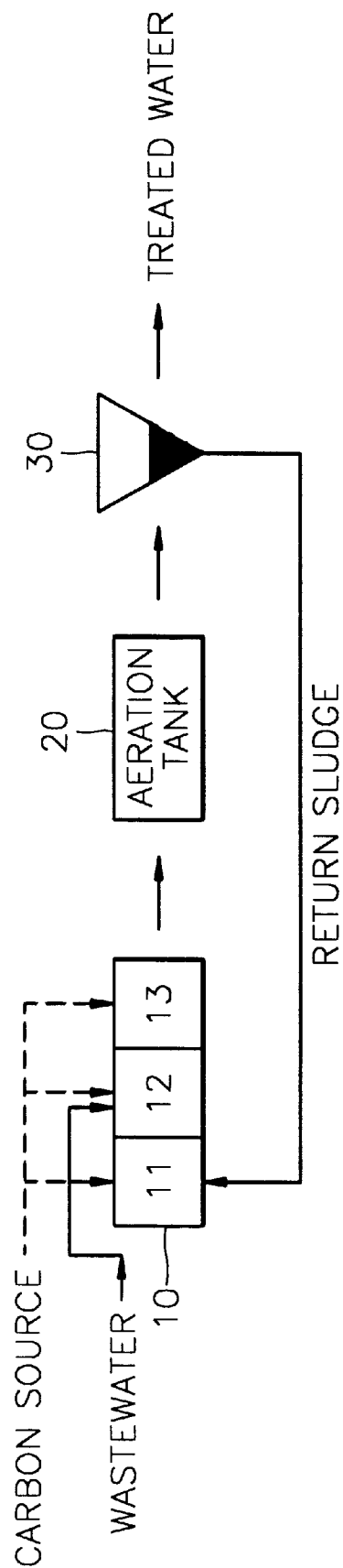
FIG. 3 is a schematic diagram showing still another embodiment of wastewater treatment process using a wastewater treatment apparatus according to the present invention.

In a wastewater treatment apparatus for removing nitrogen and phosphorus according to the present invention, an anaerobic/anoxic reaction tank may have two or more compartments. However, for convenience of explanation, an anaerobic/anoxic reaction tank having three compartments will be described.

The wastewater is provided into each compartment or selectively into compartments other than the first compartment, so the first compartment is maintained as the anaerobic condition. That is, the anaerobic/anoxic reaction tank used in the present invention refers to a reaction tank having a first compartment maintained in anaerobic conditions and the remaining compartments are maintained in anoxic conditions. Thus, in the first compartment of the anaerobic/anoxic reaction tank, the phosphorus release reaction preferentially occurs rather than denitrification of nitrate nitrogen.

Also, in the wastewater treatment apparatus for removing nitrogen and phosphorus according to the present invention, settled sludge in a settling tank is returned to the first compartment of the anaerobic/anoxic reaction tank having multiple compartments.

Also, carbon sources are added into each compartment of the anaerobic/anoxic reaction tank.

The initial amount of carbon source to be provided is determined by the concentration of nitrate nitrogen and phosphorus to be removed from the wastewater.

Methanol, ethanol and organic acids such as acetate, acetic acid and volatile fatty acid (VFA) may be used as carbon sources. In particular, by using the VFA, obtained from fermenting a portion of the settled sludge in the settling tank, as a carbon source, costs for the carbon source can be reduced.

Also, as an operating parameter for the anaerobic/anoxic reaction tank having multiple compartments in the wastewater treatment apparatus for removing nitrogen and phosphorus, an oxidation reduction potential (ORP) value could be used. That is, the ORP value indicates anaerobic condition or anoxic condition of each compartment, so an intended reaction can be caused by controlling the amount of carbon source to be provided. For example, if the ORP value is high in the first compartment where the phosphorus release reaction occurs, the amount of carbon source to be provided is reduced for active phosphorus release reaction. Also, if the ORP value is low from the second compartment on, where denitrification occurs, the amount of carbon source is increased to cause the denitrification.

Also, if the wastewater treatment process according to the present invention is added to the existing biological treatment process, nitrogen and phosphorus contained in the wastewater are partially removed by the existing biological treatment process, and then the wastewater treatment process according to the present invention either completely removes nitrogen and phosphorus remaining in the wastewater, or processes the wastewater to have a desired water quality. That is, the biologically treated water may be provided to the anaerobic/anoxic reaction tank having multiple compartments, instead of the original wastewater.

The conventional biological treatment process includes modified Ludzack-Ettinger(MLE) process, activated sludge (AS) process, rotating biological contactor(RBC) process, biofilter process and oxidation ditch process.

In the wastewater treatment process for removing nitrogen and phosphorus according to the present invention, preferably, the retention time in the anaerobic/anoxic reaction tank having multiple compartments is 20~60 minutes.

A method of wastewater treatment using the wastewater treatment apparatus for removing nitrogen and phosphorus according to the present invention will be described in detail with reference to the appended drawing.

As shown in FIG. 1, a wastewater treatment apparatus for removing nitrogen and phosphorus according to the present invention includes an anaerobic/anoxic reaction tank 10 which is divided into multiple compartments by a plurality of partitions and each compartment of which is for receiving wastewater and carbon source, an aeration tank 20 for removing phosphorus by luxury uptake of phosphorus from the treated water passed from the last compartment 13 of the anaerobic/anoxic reaction tank 10, and a settling tank 30 for settling solid components of the treated water passed from the aeration tank 20 and for returning the settled sludge into the anaerobic/anoxic reaction tank 10. FIGS. 1 through 3 show the anaerobic/anoxic reaction tank 10 having three compartments.

Influent contains nitrate nitrogen. This is because nitrogen of the wastewater is pre-treated into nitrate nitrogen by the existing wastewater treatment. Supplying a carbon source to each compartment is for increasing rates of the phosphorus release reaction and denitrification within the anaerobic/anoxic reaction tank 10. Preferably, an organic acid such as acetate is used as a carbon source. The amount of required carbon source is varied depending on the concentrations of nitrate nitrogen and phosphorus contained in the influent.

The wastewater may be provided into each compartment of the anaerobic/anoxic reaction tank 10 having multiple compartments as shown in FIG. 1, or into all compartments other than the first compartment as shown in FIG. 2, or into one of the compartments other than the first compartment as shown in FIG. 3. In other words, the wastewater may be provided wholly to one of the compartments, arbitrarily selected from the compartments other than the first compartment.

As shown in FIGS. 1 through 3, return sludge from the settling tank 30 is provided to the first compartment 11 of the anaerobic/anoxic reaction tank 10 having multiple compartments.

In the first compartment 11 of the anaerobic/anoxic reaction tank 10, the return sludge, wastewater (or biologically treated water) and carbon source are mixed, and phosphorus release reaction by the microorganism preferentially occurs in the anaerobic condition, and then denitrification of nitrate nitrogen partially occurs.

The treated water and sludge passed through the first compartment 11 are provided to the second compartment 12 of the anaerobic/anoxic reaction tank 10. In the second compartment 12 of the anaerobic/anoxic reaction tank 10, the denitrification of the nitrate nitrogen occurs due to the wastewater (or biologically treated water) and carbon source which are newly provided to the second compartment, and the release of phosphorus continues as in the first compartment 11.

The treated water and sludge of the second compartment 12 are passed to the third compartment 13 of the anaerobic/anoxic reaction tank 10. In the third compartment 13 of the anaerobic/anoxic reaction tank 10, denitrification of the nitrate nitrogen occurs due to the wastewater (or biologically treated water) and carbon source which are newly provided to the third compartment, and the release of phosphorus, which occurred in the second compartment 12, continues.

As described above, if the anaerobic/anoxic reaction tank 10 is divided into two or more compartments, the above-described reaction occurs in each compartment.

The treated water passed through the last compartment of the anaerobic/anoxic reaction tank 10 is passed into the aeration tank 20. In the aeration tank 20, phosphorus released by the reaction in the reaction tank 10 is oxidized using oxygen as an electron acceptor, and simultaneously luxury uptake of the phosphorus occurs, thereby removing phosphorus from the wastewater. In detail, when the substances stored in microorganisms are oxidized using oxygen as an electron acceptor in the aeration tank 20 placed next to the anaerobic/anoxic reaction tank 10, latent energy is synthesized in the form of adenosine triphosphate (ATP) or polyphosphate. Here, the microorganisms uptake phosphorus from the wastewater, so the phosphorus in the wastewater is removed.

The treated water passed through the aeration tank 20 is flowed into the settling tank 30, and settled sludge in the settling tank 30 is returned to the first compartment 11 of the anaerobic/anoxic reaction tank 10.

Hereinafter, examples of the wastewater treatment apparatus and method therefor according to the present invention will be described.

In the following examples, wastewater was biologically treated by an MLE process, and the wastewater processing apparatus according to the present invention, comprising an anaerobic/anoxic reaction tank having three compartments, and an aeration tank and settling tank at the rear of the reaction tank, was installed in a conventional wastewater treatment plant. Here, the volume of each compartment of the used anaerobic/anoxic reaction tank was 157L, the volume of the aeration tank was 410L, and the volume of the settling tank was 820L. Also, reaction temperature was 5~25° C., and the retention time at the anaerobic/anoxic reaction tank was 40 minutes. Sodium acetate ($CH_3COONa$) was used as a carbon source.

EXAMPLE 1

MLE-treated wastewater and carbon source were provided to each compartment of the anaerobic/anoxic reaction tank 10, and return sludge was put into the first compartment 11 of the anaerobic/anoxic reaction tank 10. That is, both of denitrification and phosphorus release reaction were designed to occur in the first compartment 11 of the anaerobic/anoxic reaction tank 10. Also, denitrification was continued in the second and third compartments 12 and 13 of the anaerobic/anoxic reaction tank 10, and the phosphorus release reaction which occurred in the previous compartment was continued.

EXAMPLE 2

MLE-treated wastewater was provided to the second compartment 12 of the anaerobic/anoxic reaction tank 10, and carbon source was added to each compartment of the reaction tank. Also, return sludge was passed to the first compartment 11 of the anaerobic/anoxic reaction tank 10. That is, this process was designed to cause the release of phosphorus in the first compartment 11 of the anaerobic/anoxic reaction tank 10, and denitrification and phosphorus release reaction in the second compartment 12 thereof.

COMPARATIVE EXAMPLE 1

MLE-treated wastewater, carbon source and return sludge were all provided to the first compartment 11 of the anaerobic/anoxic reaction tank 10 to cause mainly denitrification, and scarcely phosphorus release reaction. That is, the denitrification and phosphorus release reaction were caused in the second and third compartments 12 and 13 of the reaction tank 10.

In order to test the wastewater treatment efficiency of the above examples, removal efficiency of soluble chemical oxygen demand (SCOD), biochemical oxygen demand (BOD), total nitrogen (T-N) content and orthophosphate (ortho-P) content were measured, and the results are shown in Table 1.

TABLE 1

| items | influent (mg/L) | effluent (mg/L) | | | removal efficiency (%) | | |
|---|---|---|---|---|---|---|---|
| | | Example 1 | Example 2 | Comparative Example 1 | Example 1 | Example 2 | Comparative Example 1 |
| $SCOD_{Cr}$ | 60–210 | 20–35 | 20–35 | 20–35 | ≧50 | ≧50 | ≧50 |
| BOD | 40–110 | ≦5 | ≦5 | ≦5 | ≧90 | ≧90 | ≧90 |
| T-N | 40–75 | 0.3–18 | 0.4–25 | 0.3–20 | 65–99 | 55–99 | 60–99 |
| ortho-P | 2.5–7.0 | 0.2–1.5 | 0.2–2.3 | 1.3–4.3 | 74–98 | 64–96 | 0–29 |

Here, $SCOD_{Cr}$ represents a COD of the filtered sample, measured using potassium dichromate. Also, the total nitrogen (T-N) content is the sum of the TKN and $NO_x$ contents, which was measured using the Nessler reagent, and the content of ortho-P was analyzed using high performance liquid chromatography (HPLC).

As described in Table 1, removal efficiency of each example are similar in $SCOD_{Cr}$, BOD and T-N. However, the removal efficiency of phosphorus expressed by the content of ortho-P is as high as 60% or more in Examples 1 and 2, where the phosphorus release reaction is preferentially performed in the first compartment of the anaerobic/anoxic tank, even though the wastewater temperature is as low as 5° C. and the retention time is short at 40 minutes.

As described above, in the wastewater treatment process for removing nitrogen and phosphorus using an anaerobic/anoxic reaction tank having 3 compartments according to the present invention, the efficiency in removing nitrogen and phosphorus contained in the wastewater can be increased, and the nitrogen and phosphorus can be removed efficiently at a low temperature. In addition, the size of the reaction tank is reduced by shortening the retention time in the reaction tank, thereby lowering construction costs.

Also, when the wastewater treatment process of the present invention can be added to the existing biological treatment process, nitrogen and phosphorus of the wastewater are partially removed by the existing biological treatment process, and then the remaining nitrogen and phosphorus of the treated water can be completely removed or processed to have the desired water quality level by the wastewater treatment process according to the present invention.

What is claimed is:

1. A method of wastewater treatment for removing nitrogen and phosphorus comprising:

providing wastewater and a carbon source to an anaerobic/anoxic reaction tank having at least a first and a last compartment partitioned by a number of partitions, where the first compartment is anaerobic and the last compartment is anoxic;

flowing the treated wastewater from the last compartment of the anaerobic/anoxic reaction tank to an aeration tank and removing phosphorus by luxury uptake of the phosphorus;

flowing the treated wastewater from the aeration tank to a settling tank and settling a sludge from the wastewater; and returning the settled solid components into the first compartment of the anaerobic/anoxic reaction tank and discharging the treated wastewater from the settling tank.

2. The method of claim 1, wherein the wastewater is provided to at least one compartment of the anaerobic/anoxic reaction tank subsequent to the first compartment.

3. The method of claim 1, wherein the wastewater is provided into one or more compartments other than the first compartment of the anaerobic/anoxic reaction tank.

4. The method of claim 2, wherein the wastewater is provided into one of the compartments other than the first compartment of the anaerobic/anoxic activation tank.

5. The method of claim 1, wherein the wastewater is previously treated biologically by using a process selected from modified Ludzack-Ettinger (MLE) process, activated sludge (AS) process, rotating biological contractor (RBC) process, trickling filter (TF) process, oxidation ditch process and biofilter process.

6. The method of claim 1, wherein the carbon source is provided to each compartment of the anaerobic/anoxic reaction tank.

7. The method of claim 1, wherein the carbon source is a volatile fatty acid (VFA) obtained by fermenting the settled sludge.

8. The method of claim 1, wherein the carbon source is selected from the group consisting of acetate, acetic acid, methanol and ethanol.

9. The method of claim 1, wherein the initial amount of the carbon source to be provided is determined according to the concentration of nitrate nitrogen and phosphorus contained in the wastewater.

10. The method of claim 1, wherein the amount of carbon source provided to each compartment of the anaerobic/anoxic reaction tank is controlled based on an oxidation reduction potential (ORP) value.

11. The method of claim 1, wherein the retention time in the anaerobic/anoxic reaction tank having multiple compartments is 20~60 minutes.

12. The method of claim 1, wherein the return sludge is provided to the first compartment of the anaerobic/anoxic reaction tank having multiple compartments.

13. A method of wastewater treatment for removing nitrogen and phosphorus comprising:

providing wastewater and a carbon source to an anaerobic/anoxic reaction tank having at least a first, a second and a last compartment partitioned by a plurality of partitions, where the first compartment is anaerobic and the second compartment is anoxic;

flowing the treated wastewater from the last compartment of the anaerobic/anoxic reaction tank to an aeration tank and removing phosphorus by luxury uptake of the phosphorus;

flowing the treated wastewater from the aeration tank to a settling tank and settling a sludge from the wastewater; and returning the settled solid components into the first compartment of the anaerobic/anoxic reaction tank and discharging the treated wastewater from the settling tank.

14. The method of claim 13, wherein the wastewater is previously treated biologically by using a process selected from modified Ludzack-Ettinger (MLE) process, activated sludge (AS) process, rotating biological contractor (RBC) process, trickling filter (TF) process, oxidation ditch process and biofilter process.

15. The method of claim 13, wherein the carbon source is provided to each compartment of the anaerobic/anoxic reaction tank.

16. The method of claim 13, wherein the carbon source is a volatile fatty acid (VFA) obtained by fermenting the settled sludge.

17. The method of claim 13, wherein the carbon source is selected from the group consisting of acetate, acetic acid, methanol and ethanol.

18. The method of claim 13, wherein the initial amount of the carbon source to be provided is determined according to the concentration of nitrate nitrogen and phosphorus contained in the wastewater.

19. The method of claim 13, wherein the amount of carbon source provided to each compartment of the anaerobic/anoxic reaction tank is controlled based on an oxidation reduction potential (ORP) value.

* * * * *